April 22, 1952

K. J. KNUDSEN 2,593,897

MEANS FOR INDICATING THE MAXIMUM
OF A PLURALITY OF CONDITIONS
Filed March 14, 1947

INVENTOR.
Knud J. Knudsen
BY
Johnson, Kline and Hensel
ATTORNEYS

Patented Apr. 22, 1952

2,593,897

UNITED STATES PATENT OFFICE 2,593,897

MEANS FOR INDICATING THE MAXIMUM OF A PLURALITY OF CONDITIONS

Knud J. Knudsen, Naugatuck, Conn., assignor to The Lewis Engineering Company, Naugatuck, Conn., a corporation of Connecticut Application March 14, 1947, Serial No. 734,748

26 Claims. (Cl. 73—341)

1

This invention relates to methods and means whereby a master instrument is caused to respond to the operation of a plurality of condition-sensing instruments.

An object of the invention is to provide an improved method and apparatus for indicating at any time the value solely of the extreme one of a plurality of variables, such variables for example being temperatures of parts of a machine.

Another object of the invention is to provide an improved method and apparatus by which a single sight member indicates at any time the value solely of the extreme one of a plurality of variables located at a point remote from the sight member.

A further object of the invention is to provide an apparatus according to the above, which is small and compact, light in weight and of relatively simple construction.

Yet another object of the invention is to provide an improved electrical apparatus for use with a plurality of variables and having a portion located remote from said variables, in which the accuracy and operation of the apparatus is independent of the lead resistance in the circuit to said remote portion.

Remote indicating devices as above are of especial importance in aircraft. For example, in a jet turbine engine for an aircraft it is imperative that a reliable indication is had at all times of factors which affect the operativeness of the engine. One such factor of considerable importance is in connection with the bearing temperatures, it being necessary for continued operation of the engine that these remain below a certain safe maximum value.

In providing for the pilot of the aircraft the necessary indication of the bearing temperatures, a device should have an extremely simple indicator which may be quickly and easily read, and which gives the desired information and only the desired information accurately and at a glance. This is quite imperative due to the large number of instruments and controls confronting the pilot. In addition, the device should be light in weight and should require but a minimum amount of space, especially in the cockpit of the aircraft.

The improved remote indicator of this invention fulfills these requirements. But a single, sensitive-instrument or meter movement is employed for installation in the cockpit, having a single pointer deflecting over an easily-read graduated dial. The arrangement of the device is such that the pointer at all times indicates the temperature of the hottest one of the several

2 bearings of the engine. This is exactly the information required by the pilot, for if any one of the bearings becomes overheated (it matters not which one) corrective action on the part of the pilot is required.

In accomplishing this result, in the specific embodiments of the invention illustrated herein there is provided, located at the engine of the craft, a plurality of temperature-sensing units, one for each bearing to be sensed, these units having either thermocouples or resistance bulbs and in each case translating the bearing temperatures into deflections of control members. A plurality of sensitive-instrument electrical movements is provided, all connected for series energization and located respectively adjacent the temperature-sensing units and having deflectable members respectively cooperable with the said control members for engagement and disengagement to control a single circuit separate from said series circuit of the sensitive-instrument movements. Another instrument movement, herein called a master movement, is provided in said series circuit, said movement having a pointer and a scale and being usually located in the aircraft cockpit to provide a visual indication for the pilot.

Due to the series energization of the movements, all of them will register or respond to the same degree, such response being thus indicated in the cockpit of the aircraft by the instrument having the pointer and dial. A novel, sensitive control system is provided, responsive to the condition of the said single circuit controlled by the cooperable deflectable members and including a vacuum tube relay and power-operated potentiometer, by which the response of the electrical-instrument movements is at all times commensurate with the response of that one of the temperature-sensing units associated with the bearing of highest temperature (i. e. that unit which is connected to the engine bearing which is hottest at any time). The control system provides for a condition of continual hunting (i. e., continuous engagement and disengagement) between the pair of cooperating deflectable members which is associated with the hottest bearing, and by this organization the deflection of the control member of said pair is not materially altered or reduced, by mechanical loading, in being imparted to the deflectable member of the electrical-instrument movement, thereby enabling the master or indicating one of said movements to accurately register in the aircraft cockpit the highest of the bearing temperatures.

The device of this invention thus avoids the necessity for locating a plurality of indicators in the cockpit, one for each bearing, and automatically does the task of selecting and presenting for reading the highest bearing temperature, relieving the pilot of this task and to this extent simplifying his work.

According to another aspect of the invention, the remote-located master indicator of the invention may be omitted, and one of the other instrument movements provided with a pointer and scale, or the equivalent, whereupon the highest bearing temperature would be indicated at a location adjacent the engine, by said pointer and scale.

Due to the sensitive relay organization of the present invention involving the use of cooperable, deflectable members engageable with each other and continually hunting (which eliminates mechanical loading and disturbance of the deflection of the control member), an accurate and efficient remote indicator is provided; by the use of the series-connected instrument movements, together with separate energization therefor, the resistance of the leads to the remote portion of the device, is not an adverse factor requiring special consideration or ambient or other complicated compensation.

Still another object of the invention is to provide an indicator as above, which is so arranged that the likelihood of its giving a false indication without the pilot being apprised of this fact is extremely remote. In accomplishing this, in addition to the use of precision instrument movements which are very accurate, a safety factor is provided in the form of a signal which becomes operative if any of the sensing units should cease to function. Also, by the use of a continually hunting system, the operativeness of the remainder of the indicator may be checked, since by observing the slight oscillation of the sight member of the master instrument the pilot will know that the said remainder is functioning properly. Thus the possibility of an overheated bearing existing and the device indicating the contrary without giving notice to the pilot that such indication might be false, is eliminated.

A further object of the invention is to provide a remote indicator of the type employing cooperable members which are continually hunting, in which the period of hunting or sensing for a condition is such that the oscillation of the cooperable members and of the indicating sight member is small and not objectionable, that is, the sight member in general appears quite steady and is therefore easily readable.

In accomplishing this the novel control system or circuit is provided with a fixed resistor which I term an "anticipating resistor," connected with the power-operated potentiometer and so controlled as to anticipate and reduce the movements of the latter, which movements form part of the hunting control. By use of this anticipator resistor, the period of time of the hunting is brought considerably below the value it would have if the potentiometer were to be used alone, and consequently a smaller amplitude exists, providing for a more nearly steady indication being given by the sight member, even though the hunting is continuous.

While in the embodiments of the invention illustrated herein temperature indications are given, it should be understood that the invention is not to be limited to this use, nor to response to the maximum of several variables, since it has utility in connection with variables other than temperatures, as for example magnetism, light values, etc., and the device of the invention may also respond to the minimum of a plurality of variables as well as the maximum.

Moreover, the master instrument-movement need not be for purposes of indication, but may be used as a control, or as an indicator and control, or may be used to effect an audible signal when predetermined values are reached by any one of a plurality of variables or conditions to be sensed.

The device of the invention as illustrated herein may be so adjusted that, instead of an indication, control or other useful result being effected which involves solely the extreme one of a plurality of variables, the said result may involve the relationship of all of the variables with respect to a normal condition or value, and as a consequence the device could be used to show that one bearing was operating at above normal temperature, even though its supernormal temperature was below the normal temperature of another bearing.

Other features and advantages will hereinafter appear.

Figures 1, 2, 3:
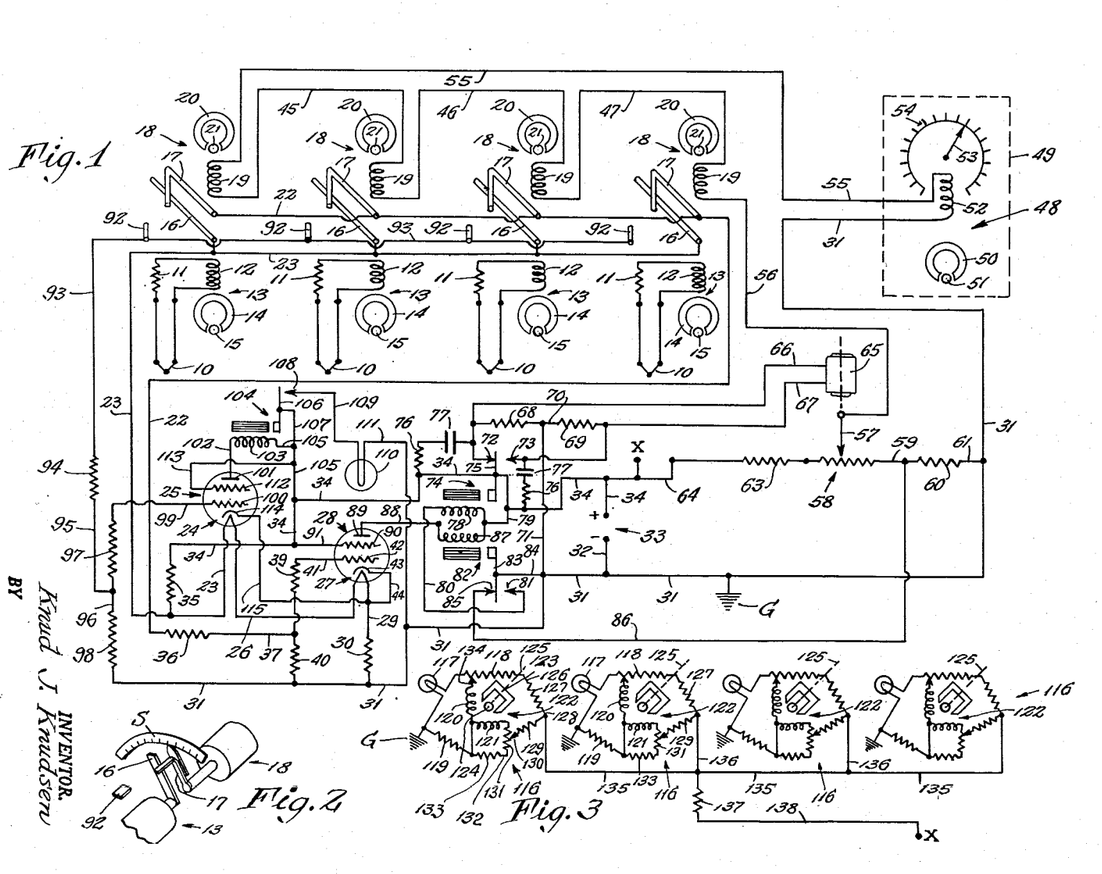
Figure 1 is a schematic diagram of a remote indicator made in accordance with the invention for indicating the temperature of the hottest one of a plurality of instrumentalities, the indicator employing a plurality of thermocouple-type pyrometers.
Fig. 2 is a perspective representation of one of the units of Fig. 1, comprising a pair of cooperable instrument movements and associated contact members.
Fig. 3 is a schematic diagram of a plurality of resistance bulb-type thermometers or pyrometers which are substitutable for the thermocouple-type pyrometers in Fig. 1.

Referring to Figs. 1 and 2, the remote indicator of this invention comprises a plurality of sensing devices in the form of thermocouples 10 which, for example, may be located respectively at the bearings of a jet-turbine aircraft engine (not shown) so as to be influenced by the heat developed in the bearings and generate electric potentials directly related in value to the temperature of the bearings. While in this instance the variables with which the indicator device is concerned are bearing temperatures, obviously other variables such as light intensities, magnetic flux intensities, etc., may be substituted by use of appropriate well known translating or sensing devices. The thermocouples 10 are connected through suitable calibrating resistors 11 respectively to movable coils 12 of D. C. electric meter movements 13 to energize the said coils. The meter movements 13 are, with the exception of the pointer or indicator portions thereof, of the well-known type having permanent magnets 14 and cores 15 with which the coils 12 are operatively associated, the said coils being movable in the magnetic field pattern produced by the magnets and cores.

Each meter movement 13 has a deflectable member 16 which is in the form of a contact-making arm of lightweight construction, mechanically connected with the movable coil 12 to be driven or deflected thereby over an arcuate path similar to the path traveled by the pointer of a meter movement. The members 16 are herein called control members. Each control member 16 is cooperable with a deflectable member 17, also in the form of a contact-making arm, the members 17 being respectively associated with electric meter movements 18 and having arcuate paths of travel similar to the control members 16. The members 17 are herein called controlled members, and said members and the control members 16 are so arranged that the latter when increasing their deflections (i. e. swinging from left to right) may drive the controlled members 17 before them, over the entire range of movement. Also, the controlled members 17 thus have driving engagement with the control members 16 and may drive and swing the latter backward (i. e. from right to left) over the path of movement in a deflection-reducing direction. The controlled members 17 are respectively mechanically coupled with movable coils 19 of the meter movements 18, the said coils being operatively associated with permanent magnets 20 and cores 21 respectively of said movements.

The usual types of spiral hairsprings (not shown) are connected with the control members 16 and controlled members 17 respectively, the said coil springs continually tending to move or swing the members from right to left, toward a left-hand "zero" position which is the non-deflection position of the meter movements 13 and 18.

For the purpose of controlling an electrical circuit, the cooperable and mutually engageable members 16 and 17 in each pair are provided with precious metal contact means, such as platinum wires for example, which are substantially non-tarnishing and non-corrosive, especially under conditions of small current and potential, thereby assuring positive closing of the circuit at all times that a controlled member 17 is in engagement with a control member 16.

In accomplishing the selecting and indicating of the temperature of whichever one of the engine bearings is the hottest, the members 16 and 17 are connected in such a manner as to control a single electrical circuit which is connected to a vacuum tube relay actuating a control circuit, which in turn governs the energization of the meter movements 18 in a novel manner shortly to be described.

As shown, the controlled members 17, although mechanically independent, are all electrically connected together, preferably through the spiral hairsprings associated therewith, by a wire 22. Also the control members 16, while mechanically independent, are all electrically connected together through their associated hairsprings by a wire 23, the wires 22 and 23 comprising the circuit controlled by the pairs of cooperable members 16, 17. It will be seen that a circuit will be established between the wires 22 and 23 whenever contact is made by engagement between a cooperable control member 16 and controlled member 17 of any one of the pairs of such cooperable members. Also, the only time that the circuit between the wires 22 and 23 will be opened is when all of the control members 16 are disengaged from the cooperable controlled members 17.

The wire 23 is connected to the heater 24 of a screen-grid vacuum tube 25 which forms part of a signal-control device to be described later, the said heater being connected by a second wire 26 with the heater 27 of a second screen-grid vacuum tube 28 which forms part of the circuit controlled by engagement and disengagement of the deflectable members 16 and 17. The heater 27 is connected by a wire 29 with a drop or current-limiting heater resistor 30, the latter being connected by a wire 31 to a supply wire 32 which is in turn connected with the negative side of a source of current 33 and is also grounded at "G." The positive side of the current source 33 is connected by a wire 34 with a current-limiting heater resistor 35 in turn connected to the control wire 23 joined to the heater 24. By this circuit both of the heaters 24 and 27 will be energized from the current supply 33.

The wire 22 is connected to a resistor 36 in turn connected by a wire 37 to a wire 38 joining together resistors 39 and 40, the latter being connected to the wire 31 and the resistor 39 being connected by a wire 41 to the control grid 42 of the vacuum tube 28. The resistors 36, 39 and 40 may have various suitable values, a set of values found to be satisfactory being 1 megohm, 3 megohms, and 20 megohms respectively. The cathode 43 of the vacuum tube 28 is connected by a wire 44 to the wire 29 of the cathode heater 27.

By this organization when the wires 22 and 23 are not connected to each other through engagement between a control member 16 and controlled member 17, the control grid 42 of the vacuum tube 28 will have a negative potential with respect to the cathode 43, due to the grid being connected through the resistors 39 and 40 (carrying virtually no current) to the negative wire 31 of the supply 33, whereas the cathode 43 is connected to the heater wire 29 which has a positive potential with respect to the negative supply wire 31 due to the drop across the resistor 30. As a consequence the tube 28 will not be in an operative condition in that no appreciable anode current will flow therefrom with the anode positively polarized.

When, however, the wire 22 is connected to the wire 23 due to engagement between a control member 16 and controlled member 17 of any one pair, the control grid 42 will be made positive with respect to the cathode 43, since it is now connected through the resistors 39 and 36 and wire 22 to the wire 23 which has a positive potential with respect to the wire 29 connected with the said cathode. It will be seen that the wire 23 is positive with respect to the wire 29 due to its being connected closer to the positive terminal of the supply 33 than is the wire 29. Because the resistor 39 is of a much lower value than the resistor 40 the tendency for the latter to maintain the control grid 42 negative is overcome during such connection of the wires 22 and 23.

In consequence of the control grid becoming positive, the tube 28 will be in a condition to function by an appreciable anode current flowing therefrom, with the anode positively polarized. Use is made of the conditions of energization and deenergization of the vacuum tube 28 to operate a control circuit which controls the energization of the meter movements 18, which in turn actuate the controlled members 17.

In accomplishing this, the movable coils 19 of the meter movements 18 are all connected in series by wires 45, 46 and 47, and by such series connection the energization of each one of the coils 19 will be identical with the energization of the other coils 19. Thus, when the coils 19 are energized, the members 17 of the meter movements 18 will all be caused to deflect to an equal extent.

For the purpose of indicating the extent of deflection of the controlled members 17 at a point remote from the movements 18 and 13 and remote from the vacuum tube 28, a master indicator is provided in the form of meter movement 48, shown blocked off from the rest of the circuit diagram by a broken-line rectangle 49 to indicate its being located at a remote point. The meter movement 48 is of the usual D. C. type having a permanent magnet 50 and core 51, and having a movable coil 52 mechanically connected with a pointer 53 deflectable over a scale 54. One end of the deflectable coil 52 is connected with the wire 31 and the other end connected with a wire 55 joined to the free end of one of the movable coils 19 of the meter movements 18. The remaining free end of the coils 19 is connected by a wire 56 to a slider 57 of a potentiometer resistor 58, one end of which is connected by a wire 59 to a fixed resistor 60 in turn connected by a wire 61 to the negative line wire 31 of the circuit. The other end of the potentiometer resistor 58 is connected by a wire 64 to the positive line wire 34 of the circuit.

By this organization current from the supply 33 is made to flow continuously through the potentiometer resistor 58 and the fixed resistors 60 and 63, and therefore the movable coils 19 and 52 of the meter movements 18 and 48 are energized by the potential drop across the resistor 60 combined with a portion of the potentiometer resistor 58 as determined by the setting of the slider 57.

It will be seen that movement of the slider 57 to the left will increase the potential drop from which the series-connected movable coils 19 and 52 are energized, thereby increasing their energization and increasing equally the deflections of the controlled members 17 and pointer 53, said deflections being all equal, and therefore the deflection of the pointer 53 indicating the deflection of the controlled members 17. Movement of the slider 57 to the right will decrease the energization of the coils 19 and 52 and decrease the deflections of the controlled members 17 and pointer 53 by equal amounts.

In accordance with the invention the vacuum tube 23 is made to reversibly actuate the potentiometer slider 57 and also to cut in and out of the circuit the fixed resistor 60 in response to engagement and disengagement of a control member 16 and controlled member 17. By this action an undulating current of controlled average value is made to pass through the coils 19 and 52 and cause a continuously hunting condition to exist between the control member 16 and controlled member 17, these members being of the pair associated with the thermocouple 10 which has the highest temperature. The term "hunting" as used herein is applied to the continuous automatic engagement and disengagement of said control and controlled members, the controlled member having substantially the same deflection as that of the control member 16 without loading or altering the deflection of the member 16. It will be seen that in consequence of this action, all of the other deflectable controlled members 17 and also the pointer 53 will be deflected to the same extent as the said controlled member 17 which is continually engaging and disengaging its associated control member 16.

In effecting this automatic control the potentiometer slider 57 is mechanically coupled to a reversible direct current motor 65 to be driven thereby in one direction or the other, the motor being preferably of the permanent-field type and having its armature connected by wires 66 and 67 to the ends of resistors 68 and 69 whose opposite ends are connected together by a wire 70. The wire 70 is connected by a wire 71 to the negative supply wire 31 of the circuit, to be energized therefrom. The wires 66 and 67 are also connected with opposite contacts 72 and 73 respectively of a relay 74 the armature 75 of which is cooperable with the said contacts. The relay armature 75 is connected to the positive supply wire 34 of the circuit, to be energized therefrom, and it will be seen that when the armature is in the position shown, engaging the contact 72, the motor 65 will be driven in one direction, and when the relay armature 75 is shifted to cause it to engage the contact 73, the motor 65 will be reversed and driven in the opposite direction. To reduce sparking at the contacts 72 and 73, resistors 76 and condensers 77 series-connected therewith are bridged across the contact circuits as shown.

The relay 74 has a driving coil 78 connected by a wire 79 to the positive line wire 34, and connected by a wire 80 to one contact 81 of a relay 82, the said contact being cooperable with an armature 83 which is in turn connected by a wire 84 with the negative supply wire 31 for energization therefrom. The relay 82 has a second and opposite contact 85 cooperable with the armature 83 and connected by a wire 86 to the wire 59 joining the resistors 58 and 60 together. The driving coil 87 of the relay 82 is connected at one end to the wires 79 and 84, and at the other end by a wire 88 to the anode 89 of the vacuum tube 23. Also the screen grid 90 of the tube 28 is connected by a wire 91 with the positive supply line 34.

It will be noted that with the relay armature 83 in the position shown, the fixed resistor 62 is shorted out of the circuit, and that when the relay armature is actuated by energization of the coil 87 the shorting of the resistor 60 is discontinued and the latter is included in the circuit. Also, when the relay armature 83 is actuated to cause the resistor 60 to be included in the circuit, it energizes through engagement with the cooperable contact 81 the driving coil 78 of the relay 74, actuating the armature 75 of the said relay and causing a reversal of the motor 65.

Operation of the circuit described above is as follows:

Assuming that the aircraft engine has been started and warmed up, the thermocouples 10 will in responding to the heat from the bearings of the engine produce electrical potentials. In general, the temperature of each one of the bearings of the engine will be different from the temperatures of the other bearings, and as a consequence each one of the control members 16 will have a deflection different from that of the other members 16, and one of said members will have a deflection greater than that of the others. Deflection of the control members 16 will cause these to become engaged with the deflectable controlled members 17 of the meter movements 18, thereby closing the circuit between the wires 22 and 23. This will render the vacuum tube 28 operative, causing an appreciable anode current to flow therefrom through the driving coil 87 of the relay 82, and actuating the relay armature 83 to disengage it from the contact 85 and engage it with the contact 81.

Such action discontinues the short-circuiting of the resistor 60 and also results in energization of the driving coil 78 of the relay 74 actuating the relay armature 75 and causing it to then engage the relay contact 73. This will energize the motor 65 in such a manner that it will drive the potentiometer contact 57 to the left. This action, together with the inclusion of the resistor 60 in the circuit, results in an increase in the potential drop which energizes the movable coils 19 of the meter movements 18 and the movable coil 52 of the master indicator movement 48. This energization will cause a deflection (to the right) of the deflectable controlled members 17 and pointer 53, and such deflection will be continued so long as the vacuum tube 28 continues to operate. During the deflection of the controlled members 17 all of the control members 16 of the meter movements 13 will follow the controlled members 17 until the latter, which moves simultaneously, pass a position corresponding to normal deflection of the least-deflected control member 16. That is, as the controlled members 17 swing to the right, the first of the members 16 to leave its associated member 17 will be that member 16 associated with the thermocouple 10 having the lowest temperature. The next of the control members 16 to leave its associated controlled member 17 will be the member 16 associated with the thermocouple having the next lowest temperature, and so on. The last of the controlled members 17 leaving its associated control member 16 will be in the pair associated with the thermocouple 10 having the highest temperature, since the member 16 of this pair will evidence the greatest deflection. Immediately upon the last of the controlled members 17 leaving its associated member 16, the circuit between the wires 22 and 23 will be opened and the tube 28 rendered inoperative. This will immediately deenergize both of the relays 74 and 82, the latter one first since its armature controls the energization of the relay 74. Upon such deenergization the resistor 60 will be short-circuited and the motor 65 will be energized so as to drive the potentiometer slider 57 to the right.

This immediately acts to quickly reduce the deflection of the controlled members 17 and pointer 53, and because of the relatively great change in the potential drop energizing the meter movements 18 and 48 due to the resistor 60 being short-circuited, the members 17 will travel only a minute distance beyond the point where disengagement is effected with the most-deflected one of the control members 16.

The spiral coil springs respectively acting on the controlled members 17 and pointer 53 immediately reduce the deflection of these after such disengagement and again cause engagement between the most-deflected one of the members 16 and its associated member 17. This again energizes the tube 28, cuts in the resistor 60 and starts to shift the slider 57 to the left again so as to increase the deflections of the members 17 and pointer 53. This operation is repeated at the rate of three or four times per second and results in a condition of hunting between the most-deflected one of the members 16 and its associated member 17. During such hunting the reversal of the motor 65 and inclusion and exclusion of the resistor 60 results in an undulating current passing through the movable coils 19 and 52. The average value of this undulating current is subject to change and depends on the average position of the potentiometer slider 57. If the most-deflected one of the control members 16 has relatively low deflection, the average value of the undulating current passing through the coils 19 and 52 will be relatively low, and if the most-deflected one of the members 16 has a relatively great deflection the average value of the undulating current in the coils 19 and 52 will be relatively great due to the mean position of the slider 57 being shifted to the left from its previous mean position.

During the condition of hunting, the motor 65 is, as mentioned, being continually reversed; however, its movement in either one direction or the other is extremely slight because most of such movement is anticipated, so to speak, by the inclusion and shorting out of the resistor 60, and therefore I term this resistor an "anticipator resistor." By the provision of the anticipator resistor 60 not only is the amount of movement of the motor 65 greatly reduced so that it is barely perceptible, but the amount of vibration or oscillation of the controlled members 17 and pointer 53 is considerably minimized, so that these parts upon casual observation appear to be steady rather than in a vibrating or oscillating condition, although actually they are vibrating back and forth over an extremely small arc.

This substantially steady state of the pointer 53 is of considerable advantage, since it enables the pilot of the aircraft, for example, when glancing at the pointer to ascertain quickly and without difficulty the reading on the scale 54. It will be seen that such reading is indicative of the deflected positions of the controlled members 17 which are in turn indicative of the deflected position of the most-deflected one of the control members 16, the latter being a measure of the temperature of the bearing with which its thermocouple 10 is associated. Therefore the pointer 53 will at all times indicate solely the temperature of the hottest of the thermocouples 10 and hottest of the bearings of the aircraft engine.

Should the bearing temperatures change at any time and a cooler bearing heat up and surpass in temperature the bearing normally operating at the highest heat, thereby indicating perhaps an unusual condition or one which might endanger the operation of the aircraft engine, the temperature of this newly-hot bearing will be the determining factor and will be indicated by the pointer 53 upon such temperature rising above the temperature of the other bearings.

The organization of the remote indicator of this invention is such that all of the parts and circuits, with the exception of the master indicator 48 blocked off by the broken-line rectangle, may be grouped together and located adjacent the aircraft engine, while the master indicator may be located within the cockpit of the aircraft. It will be seen that only a single two-wire line, comprising the wires 31 and 55, need connect the master indicator movement 48 with the rest of the device. Also this line may be of substantial length and have appreciable resistance without adversely affecting the sensitivity or accuracy of the readings since it does not carry small thermocouple currents for example but instead carries an energizing current depending in magnitude upon the potential drop existing between the wires 31 and 56. This potential drop may have a substantial magnitude since it is dependent on a current supply 33 of adequate capacity.

The operation of the present indicator device is such that the condition of the hunting which exists between the most-deflected one of the control members 16 and its associated member 17 results in the latter imposing practically no load on the member 16 and therefore not altering the deflection of the member 16 from the value it would normally have, and this is an important advantage in attaining an accurate indication.

Where remote indications are not desired or necessary the master instrument 48 may be omitted entirely and an indication given by any one of the controlled members 17, in conjunction with a suitable scale S, if so desired, (see Fig. 2) since each member 17 deflects an amount equal to the deflection of the others, and of the pointer 53, and may operate as a pointer.

According to the invention a signal device is provided as a safety feature to indicate if any of the pyrometer devices ceases to function. With the present remote indicator, if no signal device were provided, the temperature of a bearing associated with a defective pyrometer might rise to a dangerously high value without an indication of this being had on the master indicator 48. However, with the signal device as provided herein, failure of any of the pyrometers will be indicated and brought to the attention of the pilot, so that he may take account of this and employ whatever steps are necessary.

In accomplishing this signalling, settable contacts 92 are provided for cooperation respectively with the deflectable control members 16, each contact 92 being settable to a predetermind position by hand. The contacts 92 are electrically connected together by a wire 93 which connects with a resistor 94 in turn connected by a wire 95 to a wire 96 joining together resistors 97 and 98. The resistor 98 is connected with the negative supply wire 31 of the circuit, and the resistor 97 connected by a wire 99 with the control grid 100 of the vacuum tube 25. The anode 101 of the said vacuum tube is connected by a wire 102 with the driving coil 103 of a relay 104, the other end of the coil being connected by a wire 105 to the positive supply wire 34 of the circuit. The relay 104 has an armature 106 connected by a wire 107 with the wire 105, the said armature being cooperable with a contact 108 connected by a wire 109 with a signal lamp 110 which latter is in turn connected by a wire 111 with the negative supply wire 31. The screen grid 112 of the vacuum tube 25 is connected by a wire 113 with the wire 105, and the cathode 114 of the tube is connected by a wire 115 with the wires 29 and 44 connected with the cathode 43 of the tube 28.

The resistors 94, 97 and 98 may have any suitable values, those found to be satisfactory being 1 megohm, 3 megohms and 20 megohms respectively.

According to this organization if at any time one of the pyrometer devices involving the meter movements 13 should fail in its operation the control member 16 thereof will be brought back toward "zero" by its spiral hairspring, whereupon it will engage the associated contact 92. This will connect the wires 23 and 93 together and cause a positive potential to be applied to the control grid 100 in the same manner as described in connection with the vacuum tube 28, whereupon the vacuum tube 25 will become operative and the anode current thereof will energize the relay 103 and cause the signal light 110 to be illuminated. The signal light 110 may be located in the cockpit adjacent the master indicator 48 where it will provide a signal for the pilot of the craft and indicate that one or more of the pyrometers of the indicating system is inoperative.

Normally when an open circuit exists between the wires 23 and 93 the control grid 100 of the vacuum tube 25 will be of negative polarity with respect to the cathode 114 of the tube, so that the latter will be maintained in inoperative condition.

The pilot of the aircraft may ascertain that the remainder of the indicating device (all portions excepting the pyrometer circuits) is operating properly by merely determining that the pointer 53 has a slight oscillation, indicating that the cooperable parts of the circuit are hunting. If such hunting should cease, due to malfunctioning of any components of the circuit, this would be evidenced by the pointer 53 ceasing to oscillate, and would apprise the pilot that the indicating device is inoperative. This circumstance, together with the provision of the signal light 110 provides an indication as to the operativeness of the device.

During the warming-up period of the aircraft engine the signal light 110 will be operative if the indicating device is put into operation, and when the light becomes extinguished it will indicate that the oil and bearings of the engine are warmed up sufficiently to permit operation of the craft. The bearing temperature at which the signal light will be extinguished may be predetermined by properly setting the adjustable contacts 92.

It will be seen that the current carried by the wires 31 and 55 is supplied from the source 33, which has considerable capacity. Since the wires 31 and 55 do not carry thermocouple currents or other currents of extremely weak magnitude, the resistance and length of the wires may be relatively great without adversely affecting the accuracy and efficiency of the indicator. Also, no ambient compensation need be provided for the wires 31 and 55, since the indicator functions properly without such compensation.

While in Fig. 1 the circuit is shown as including thermocouples 10 which are responsive to the heat of the bearings of the aircraft engine, it should be understood that other sensing, measuring or translating devices may be employed instead of thermocouples. For example, in Fig. 3 a number of resistance thermometer units 116 are shown, having resistance bulbs 117 respectively, which are associated with the respective bearings of the aircraft engine. Each resistance thermometer unit 116 comprises a bridge circuit including resistors 118 and 119 respectively connected with the leads from the bulb 117, the latter resistor at said connection being grounded at "G" and having its other end connected to deflecting and restoring coils 120 and 121 respectively of a ratio meter 122. The ratio meter 122 has a permanent magnet 123 and core 124, and the coils 120 and 121 thereof may be mechanically coupled, as indicated by the broken line 125, with one of the control members 16 of the circuit of Fig. 1. The resistor 118 has one end connected by a wire 126 with a resistor 127 which is connected by a wire 128 with a resistor 129, the latter connecting with an adjustable contact 130 of a resistor 131. One end of the resistor 131 is connected with the restoring coil 121 of the ratio meter and the other end is connected by a wire 132 with a resistor 133 which is connected with the resistor 119 and with the other end of the restoring coil 121. The resistor 119 has an adjustable contact 134 which is connected with the other end of the deflecting coil 120 of the ratio meter. The wires 128 of the resistance thermometer unit are all connected together by wires 135 and 136, and the wire 135 is connected through a resistor 137 with a wire 138 which latter terminates in a terminal marked "X," this terminal corresponding with the similarly marked terminal of Fig. 1 which is joined to the positive supply wire 64 of the circuit.

By this organization all of the resistance thermometer units 116 are energized from the current supply 33, and the respective temperatures of the bulbs 117 thereof are translated into deflections of the control members 16 in the same manner as the potentials of the thermocouples 10 are translated. The operation of the circuit employing the resistance thermometer bulbs 116 is thus broadly the same as the operation described in connection with the circuit of Fig. 1.

While the master instrument 48 is shown as a visual indicator, it should be understood that it may be readily employed in conjunction with known devices to effect an audible signal or control other apparatus, or produce other useful end-results.

All of the components of the devices of Fig. 1 or 3 are generally small and not cumbersome, and of light weight, and with the exception of the sensing units 10 or 17 and master indicator 48 may be compactly grouped together and occupy a small space, and may be enclosed in a single small casing. This, together with the mentioned exceptions which are of themselves small and compact, adapt the device for use in aircraft and the like where space and weight must be held to a minimum.

While the remote indicator of the present invention is shown as indicating the temperature of the hottest one of a plurality of instrumentalities which are subjected to heat, it should be understood that it is readily adaptable for indicating other extremes, as for example the temperature of the coolest of such instrumentalities, and to accomplish this it is merely necessary to reverse the action of the spiral hairsprings associated with the control members 16 so that they tend to hold the latter swung to the right, and to reverse the connections of the thermocouples 10 so that the potentials generated thereby tend to swing to the left the members 16 instead of to the right. Thus the members 16 deflect to the left in response to heating of the thermocouples 10, and the least deflected member indicates the coolest thermocouple and bearing. The operation of the remote indicator is, aside from this, similar to that already described in connection with the indication of a maximum temperature.

Although the remote indicator of this invention is shown in connection with the measurement and the indication of temperatures, it should be understood that variables other than temperatures, such as magnetism, light, etc., may be measured and indicated, either maximum or minimum values.

The device of the present invention may be so adjusted and arranged as to indicate a heating above normal of any one of the engine bearings with which the thermocouples 10 are associated, even though the raised temperature of said bearing is below the normal temperature of another bearing. This would be of considerable advantage where it was essential to know of any supernormal temperature existing, even though said supernormal temperature was within safe limits, in order to enable remedial steps to be taken to prevent a dangerously high temperature eventually occurring.

Assuming that the several bearings in an engine have different normal operating temperatures, the calibrating resistors 11 in Fig. 1 may be so adjusted that all of the control members 16 have substantially the same deflection, and if desired this deflection may be made the equivalent of that of the most-deflected one of the control members 16 under the arrangement first described. In this case the pointer 53 of the master instrument 48 would indicate under normal conditions the temperature of the hottest bearing. If any of the bearings should heat up in excess of its normal temperature, the control member 16 associated therewith would surpass in deflection the other control members 16, and the controlled members 17 would follow the surpassing control member 16, whereupon the pointer 53 would have an increased deflection beyond its normal setting, indicating an increase over the normal operating temperature of the bearings, and this indication would occur even though a lowering of bearing temperatures took place elsewhere in the engine. The amount of increase would also be determinable, since it would be the difference between the normal and new or supernormal settings of the pointer 53.

Variations and modifications may be made within the scope of this invention and portions of the improvements may be used without others.

I claim:

1. An instrument for continually indicating the temperature solely of whichever one of a plurality of instrumentalities which are subjected to heat is the extreme thereof, comprising a pyrometer for each instrumentality, having a control member movable in relation to the temperatures of the instrumentality; series-connected electric sensitive-instrument movements having deflectable parts respectively engageable with and disengageable from said control members for making and breaking electrical circuits, said parts being all equally deflectable in response to a common energizing current; energizing means controlled by said members and parts for automatically simultaneously energizing the instrument movements with an undulating current to cause the parts thereof to deflect to the same extent as the control member of whichever pyrometer is associated with the extreme instrumentality, and to cause continual engagement and disengagement between said member and the associated one of said parts without materially altering the deflection of the member, a condition of hunting existing between the said member and part, said energizing means including a potentiometer and a reversing motor operating the latter and reversed by said engagement and disengagement, and including a fixed resistance element made operative and inoperative alternately and periodically by said engagement and disengagement to produce undulations in said current; and an additional electric sensitive-instrument movement located remote from the other instrument movements and series-connected therewith to indicate the deflection of the deflectable parts thereof.

2. An instrument for continually indicating the temperature solely of whichever one of a plurality of instrumentalities which are subjected to heat is the extreme thereof, comprising a resistance thermometer for each instrumentality, having a control member movable in relation to the temperatures of the instrumentality; series-connected electric sensitive-instrument movements having deflectable parts respectively engageable with and disengageable from said control members for making and breaking electrical circuits, said parts being all equally deflectable in response to a common energizing current; energizing means controlled by said members and parts for automatically simultaneously energizing the instrument movements with an undulating current to cause the parts thereof to deflect to the same extent as the control member of the resistance thermometer associated with the extreme instrumentality, and to cause continual engagement and disengagement between said member and the associated one of said parts without materially altering the deflection of the member, a condition of hunting existing between the said control member and deflectable part, said means including a potentiometer and a reversing motor operating the latter and reversed by said engagement and disengagement, and including a fixed resistance element made operative and inoperative alternately and periodically by said engagement and disengagement, to produce undulations in said current; and an additional electric sensitive-instrument movement located remote from the other instrument movements and series-connected therewith to indicate the deflection of the deflectable parts thereof.

3. In an instrument for continually evaluating whichever of a plurality of variables is the extreme thereof, a translating device for each variable, having a sensitive-instrument movement including a deflectable control member movable in relation with the variable; a plurality of energy-responsive devices comprising electric sensitive-instrument movements having deflectable parts movable in relation to the energization of said devices, said parts moving in substantially the same paths as and being respectively engageable with said control members for making and breaking electrical circuits; and energizing means including a vacuum tube relay controlled by said members and parts, and including a source of energy, for automatically simultaneously energizing the energy-responsive devices to cause all of the deflectable parts thereof to deflect substantially to the same extent as the control member of the translating device associated with the extreme variable, and to cause continual engagement and disengagement between said control member and the associated one of said parts.

4. An instrument for indicating continually the value of whichever of a plurality of independent unknown variables is the extreme thereof, comprising a set of separate, similar means each including a member movable in response to a separate one of said variables proportionate with the variable and in a predetermined direction; a set of electrical means similar to each other and each including a movable member, said electrical set being in series and responsive to electrical energy and the members thereof being paired respectively with the member of said other set; an adjustable energizing means at all times simultaneously energizing the said electrical set with related amounts of energy and producing related movements of said members acting in a direction opposing said first-named members; a plurality of separate switches each actuated by a separate pair of said members only upon establishment of a predetermined relation between said pair; means responsive to actuation of a switch, for adjusting said energizing means to cause energization of said electrical set to produce and maintain said predetermined relation between one pair of the members; and means for continually indicating the extent of energization of said electrical set of means, to indicate the value of said extreme variable.

5. An instrument for indicating continually the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; and adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to continually repass through said given ratio and thus maintain a continued switch actuation; and indicating means responsive to the extent of energization of said second set of translating means, whereby the value of said extreme variable will be indicated.

6. An instrument for indicating continually the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with equal amounts of energy to produce equal forces on the parts thereof such that when said unknown variables all have different values only one pair of opposed forces may be made to have a given predetermined ratio at any one time by adjustment of said energizing means; a plurality of separate, actuable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and indicating means responsive to the extent of energization of said second set of translating means, whereby the value of said extreme variable will be indicated.

7. An instrument for indicating continually the value of whichever of a plurality of independent unknown variables is the extreme thereof, comprising a first set of separate, similar translating means each having a movable part and each responding to a separate one of said variables to produce a force on said part in a predetermined direction, which is proportionate wtih the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; indicating means responsive to the extent of energization of said second set of translating means, whereby the value of said extreme variable will be indicated; and means for providing a signal when any one of the translating means of the first set is inoperative, thereby to apprise a user of possible unreliability of the indication of said indicating means.

8. An instrument for indicating continually the value whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and an indicator actuated by a translating means of said second set, whereby the value of said extreme variable will be indicated.

9. An instrument for responding continually in accordance with the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and a device operable to different extents, actuated by one of said second set of translating means whereby said device is ultimately responsive to said extreme variable.

10. An instrument for responding continually in accordance with the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and means including a device located at a point remote from the second set of translating means and operable to different extents, providing a response in accordance with the energization of said second set of translating means whereby said device is ultimately responsive to said extreme variable.

11. An instrument for indicating continually the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; a source of electrical energy; means for varying said source; means for simultaneously energizing all of the second set of translating means from said energy source with related amounts of energy to produce related forces on the parts thereof such that when said unknown variables all have different values only one pair of opposed forces may be made to have a given predetermined ratio at any one time by adjustment of said varying means; a plurality of separate, actuatable switch means each controlled by a separate pair of translating means and each actuated only when the opposing forces of the said parts thereof are passed through said given ratio; automatically operative means responsive to an actuation of any one switch means, for adjusting said varying means to cause said forces to repass through said given ratio and thus maintain a continued switch actuation; and indicating means responsive to the extent of energization of said second set of translating means, whereby the value of said extreme variable will be indicated.

12. In an instrument for responding continually to whichever of a plurality of variables represents the maximum of all departures from normal values of said variables, a first set of separate, similar translating means each having a movable part, said means being respectively responsive to said variables to produce forces on said parts in predetermined directions which are all equal when the variables are at their respective normal values; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce equal forces on the parts thereof such that when said unknown variables all have different deviations from normal only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and a device operable to a greater or lesser extent, actuated by one of said second set of translating means whereby said device is ultimately responsive to that variable which is most at variance with its normal value.

13. In an instrument for responding continually to whichever of a plurality of variables represents the maximum of all departures from normal values of said variables, a first set of separate, similar translating means each having a movable part, said means being respectively responsive to said variables to produce forces on said parts in predetermined directions which are all equal when the variables are at their respective normal values; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce equal forces on the parts thereof such that when said unknown variables all have different deviations from normal only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and a device operable to a greater or lesser extent, responding in accordance with the energization of said second set of translating means whereby said device is ultimately responsive to that variable which is most at variance with its normal value.

14. An instrument for indicating continually the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; and automatically operative means responsive to an actuation of any one switch means, for adjusting said energizing means to cause said forces to repass through said given ratio and thus maintain a continued switch actuation, one of the translating means of the second set having indicating means to indicate the degree of energization thereof.

15. An instrument for indicating continually the value of whichever of a plurality of independent unknown variables is the extreme thereof, comprising a first set of separate, similar translating means each having a movable part and each responding to a separate one of said variables to produce a force on said part in a predetermined direction, which is proportionate with the variable; a second set of electromagnetic translating means similar to each other, including movable parts paired with those of the first set and having forces resulting from electrical energy supplied to said second set, said forces being in a direction to oppose the forces of the first set; an adjustable electrical energizing means for simultaneously energizing all of the second set of translating means with related amounts of energy to produce related forces on the parts thereof such that when said unknown variables all have different values only one pair of opposed forces may be made to have a given predetermined ratio at any one time by adjustment of said energizing means; a plurality of separate, actuatable switch means each controlled by a separate pair of translating means and each actuated only when the opposing forces of the said parts thereof are passing through said given ratio; automatically operative means responsive to an actuation of any one switch means, for adjusting said energizing means to cause said forces to repass through said given ratio and thus maintain a continued switch actuation; and means for indicating at a point remote from the second set of translating means the degree of energization thereof, whereby the value of said extreme variable will be indicated.

16. The invention as defined in claim 5, in which the sets of translating means comprise sensitive instrument movements having the said movable parts on which the produced forces act, in which the switch means comprises cooperable contacts on said movable parts, and in which actuation of any switch means by a pair of translating means does not materially alter the settings of the movable parts.

17. The invention as defined in claim 5, in which each pair of translating means and the switch means associated therewith comprise instrument movements having the said movable parts on which the produced forces act, said parts being deflectable in the same directions in a common path and being engageable with each other when equally deflected to form an electrical connection therebetween, and in which the automatically-operative means causes continual engagement and disengagement of said parts resulting in an average energization of the second set which is related to the value of the extreme variable at all times.

18. The invention as defined in claim 5, in which each pair of translating means and the switch means associated therewith comprise sensitive instrument movements respectively having the said movable parts on which the produced forces act, said parts being deflectable in the same directions in a common path and engageable with each other when equally deflected to form an electrical connection therebetween, and in which the automatically operative means causes continual engagement and disengagement of one pair of said parts resulting in an average energization of the said second set which is related to the deflection of the movable part of the first set which is in said one pair, said engagement and disengagement not materially altering the deflection of said movable part.

19. The invention as defined in claim 5, in which the energizing means includes a circuit having a fixed resistance element for decreasing the energy available to the second set, and includes a switch for rendering said element operative or inoperative, said switch being continually actuated by said automatically operative means, and said energizing means thereby supplying an undulating energization to the said second set.

20. The invention as defined in claim 5, in which there is a reversing motor, in which the energizing means includes a circuit having a potentiometer actuated by the motor and also a fixed resistor element for decreasing the energy available to the second set, and further includes a switch for rendering said element operative or inoperative, said switch and motor being continually actuated by said automatically operative means, and said energizing means thereby supplying an undulating energization to the said second set.

21. The invention as defined in claim 5, in which the movable parts of each pair have contacts engageable with each other, and in which there are means including contacts engageable with those of the movable parts of the first set of translating means, providing a signal when any one of said first set is inoperative, thereby to apprise a user of possible unreliability of the indication of said indicating means.

22. The invention as defined in claim 5, in which there is a reversing motor, in which the energizing means includes a circuit having a potentiometer actuated by the motor, said motor being continually actuated by said automatically operative means and said energizing means thereby supplying an undulating energization to the said second set.

23. The invention as defined in claim 5, in which the switch means comprise contacts on the pairs of movable parts, in which the energizing means supplies undulating energy to the second set of translating means to cause continual engagement and disengagement between one contact of said set and its associated contact, the force on said one contact being a maximum during such engagement and a minimum during such disengagement.

24. In an indicating device, a pair of juxtaposed deflectable members movable in coextensive paths and each unidirectionally drivingly engageable with the other, said members making electrical contact when engaged; means applying a deflecting force to one of said members in response to changes in a variable; yieldable means acting on the other member, normally tending to maintain engagement of said members to maintain said electrical contact; automatic means responsive to contact established between the members and substantially independent of physical forces existing between the members, applying a sufficient deflecting force to the other of said members to overcome said yieldable means and separate said members, said contact-responsive means being rendered inoperative immediately upon such separation to limit the degree of separation to a minute value whereby both the members are periodically alternately engaged and disengaged while substantially juxtaposed, and are thereby maintained in substantially identical deflected positions, said automatic means including an energy supply, a control means for increasing or decreasing the energy supplied thereby, and means converting the energy to a deflecting force applied to said other member, said control means being actuated in one sense or the other in response to making or breaking of said contact; and means including a mechanism located at a point remote from said other member, indicating the deflected positions of the latter to thereby give an indication of the value of said variable.

25. In an indicating instrument, a pair of separate deflectable members movable along a common path; means for causing deflection of one member in response to changes in a variable; abutment means including a yieldable element tending to maintain said other member at all times in a predetermined position with respect to the one member; force-applying means responsive to attainment of said position by the other member and substantially independent of physical force, existing between the members, for moving said other member out of said position against the action of said yieldable element, said force-applying means being automatically rendered ineffective against said yielding element whenever said other member is out of said position whereby both members continually hunt without materially altering the deflection of the one member and the position of said other member is at all times related to the deflection of the one member, said force-applying means including an energy supply, a control means for increasing or decreasing the energy supplied thereby, and means converting the energy to a deflecting force applied to said other member, said control means being actuated in one sense or the other in response to said other member moving in or out of said position; and means actuated by the force-applying means, providing an indication at a point remote from said other member, of the deflected positions thereof to thereby give an indication of the value of said variable.

26. In an indicating device, a pair of electric instrument movements having deflectable members movable respectively in coextensive paths and having contact abutments engageable with each other when the members are deflected substantially to the same extent; means energizing one movement to cause deflection of its member in response to heating of an instrumentality; yieldable means acting on the member of the other movement, tending to maintain the abutments of the members in engagement with each other; a variable source of energy for energizing the other instrument movement, tending to cause disengagement of the abutment of the member thereof from the cooperable abutment against the action of said yieldable means; means including a circuit controlled by said abutments, automatically stepping-up said source of energy to cause disengagement of the abutments, said means being rendered inoperative whenever such disengagement occurs whereby the said members continually hunt while the first member maintains substantially its normal deflection; and means for indicating at a point remote from said second member the deflected positions of the latter.

KNUD J. KNUDSEN.

REFERENCES CITED

The following references are of record in the file of this patent:

UNITED STATES PATENTS

| Number | Name | Date |
|---|---|---|
| 2,285,716 | Hulsberg | June 9, 1942 |
| 2,420,969 | Newell | May 20, 1947 |